(12) United States Patent
Zhou

(10) Patent No.: US 12,449,657 B2
(45) Date of Patent: Oct. 21, 2025

(54) AR GLASSES AND AR GLASSES KIT

(71) Applicant: YUTOU TECHNOLOGY (HANGZHOU) CO., LTD., Hangzhou (CN)

(72) Inventor: Sen Zhou, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 507 days.

(21) Appl. No.: 17/770,467

(22) PCT Filed: Sep. 27, 2020

(86) PCT No.: PCT/CN2020/118078
§ 371 (c)(1),
(2) Date: Apr. 20, 2022

(87) PCT Pub. No.: WO2021/077988
PCT Pub. Date: Apr. 29, 2021

(65) Prior Publication Data
US 2022/0404623 A1 Dec. 22, 2022

(30) Foreign Application Priority Data
Oct. 23, 2019 (CN) .......................... 201911014239.3

(51) Int. Cl.
*G02B 27/01* (2006.01)
(52) U.S. Cl.
CPC .... *G02B 27/0172* (2013.01); *G02B 2027/014* (2013.01); *G02B 2027/0178* (2013.01)
(58) Field of Classification Search
CPC .... G02B 27/01–0189; G02B 2027/0105–0198
See application file for complete search history.

(56) References Cited

U.S. PATENT DOCUMENTS

2008/0316605 A1* 12/2008 Hazell ................... G09F 9/3023
351/158
2010/0118139 A1* 5/2010 Huang ................... G02C 11/10
340/815.45
(Continued)

FOREIGN PATENT DOCUMENTS

CN 200993694 Y 12/2007
CN 101419339 A 4/2009
(Continued)

OTHER PUBLICATIONS

CN 201911014239.3—International Search Report, mailed Dec. 30, 2020, 4 pages. (with English translation).
(Continued)

*Primary Examiner* — Christopher A Lamb, II
(74) *Attorney, Agent, or Firm* — Getech Law LLC; Jun Ye

(57) ABSTRACT

The AR glasses include a power supply unit, a computing processing unit, a communication unit and a wired connector. The wired connector is connected to a host: when the host is not connected, the power supply unit supplies power to the AR glasses, the computing processing unit may receive and process AR glasses data, and the communication unit is configured to perform data communication with an external device; when the host is connected, a host power supply supplies power to the AR glasses and charges the power supply unit, and the computing processing unit is configured to receive AR glasses data, send the data to a processor of the host through the wired connector for processing, and receive the processed AR glasses data through the wired connector.

8 Claims, 4 Drawing Sheets

(56) References Cited

U.S. PATENT DOCUMENTS

2016/0109931 A1* 4/2016 Kobayashi ........... G02B 27/017 345/212
2017/0364144 A1 12/2017 Petrov

FOREIGN PATENT DOCUMENTS

| | | | |
|---|---|---|---|
| CN | 203508718 U | 4/2014 |
| CN | 105205471 A | 12/2015 |
| CN | 105355196 A | 2/2016 |
| CN | 105929958 A | 9/2016 |
| CN | 106095007 A | 11/2016 |
| CN | 206400189 U | 8/2017 |
| CN | 109407757 A | 3/2019 |
| CN | 110189665 A | 8/2019 |
| CN | 111025636 A | 4/2020 |

OTHER PUBLICATIONS

CN 201911014239.3—Written Opinion, mailed Dec. 30, 2020, 5 pages. (with English translation).
CN 201911014239.3—First Office Action, mailed Feb. 1, 2021, 14 pages. (with English translation).
CN 201911014239.3—Supplemental International Search Report, mailed Jun. 19, 2021, 2 pages. (with English translation).
CN201911014239.3—Fourth Ofice Action mailed on Jul. 15, 2022, 21 pages.
PCT/CN2020/118078—International Search Report and Written Opinion malled on Dec. 30, 2020, 15 pages.
CN201911014239.3—Second Office Action mailed on Jul. 1, 2021, 14 pages.
CN201911014239.3—Third Office Action mailed on May 31, 2022, 16 pages.

* cited by examiner

AR GLASSES AND AR GLASSES KIT

TECHNICAL FIELD

The present invention relates to the technical field of augmented reality (AR), and in particular relates to AR glasses and an AR glasses kit.

BACKGROUND

Existing augmented reality (AR) glasses products are divided into one-piece and tethered products. The one-piece AR glasses are internally provided with a battery, includes a complete computing processing unit and all electronic components, can work independently and meet the functional requirements of the AR glasses. The tethered AR glasses do not have a battery, and may be provided with part of a computing unit or may be not provided with a computing unit, but both of which need to be connected to a host in a wired manner. The host supplies power to the AR glasses, and the complete function requirements of the AR glasses are met.

However, the one-piece AR glasses need to include the complete computing processing unit and all electronic components, and in order to guarantee the duration, the battery with a high capacity needs to be built in, which results in the AR glasses that are large in size, overweight, bulky in appearance, uncomfortable for a user to wear for a long time, and poor in user experience. The tethered AR glasses do not have the battery, and power supply and all or most of computing processing are connected to the host in a wired manner and are borne by the host. Therefore, the weight of the device can be effectively controlled, and the appearance can be portable and attractive. But the tethered AR glasses have the defect that the tethered AR glasses must be matched with the host in a wired manner for use, and user's product experience is also greatly affected.

SUMMARY

The present invention aims to provide AR glasses and an AR glasses kit, which not only can be used as one-piece AR glasses, but also can be used as tethered AR glasses, such that user's wearing experience is improved while guaranteeing realization of the functions of the AR glasses.

In order to solve the above technical problems, the present invention provides AR glasses, comprising a power supply unit, a computing processing unit, a communication unit and a wired connector, wherein the power supply unit is respectively connected to the computing processing unit and the wired connector, the computing processing unit is respectively connected to the communication unit and the wired connector, and the wired connector is configured to be connected to a host;

when the wired connector is not connected to the host, the power supply unit is configured to supply power to the AR glasses, the computing processing unit is configured to receive and process AR glasses data, and the communication unit is configured to perform data communication with an external device; and when the wired connector is connected to the host, a host power supply supplies power to the AR glasses and charges the power supply unit, and the computing processing unit is configured to receive AR glasses data, send the data to a processor of the host through the wired connector for processing, and receive the processed AR glasses data through the wired connector.

Furthermore, the AR glasses further comprise a camera, an inertial measurement unit, a microphone, optical machines and a loudspeaker which are connected to the computing processing unit. The AR glasses data comprises data acquired by the camera, the inertial measurement unit, the microphone and the communication unit. The computing processing unit is configured to correspondingly output the processed AR glasses data to the optical machines, the loudspeaker and the communication unit.

Furthermore, the inertial measurement unit comprises an accelerometer, a gyroscope and a magnetometer.

Furthermore, the power supply unit comprises a small-capacity battery and a charging and discharging management unit, wherein the small-capacity battery is connected to the charging and discharging management unit, and the charging and discharging management unit is respectively connected to the computing processing unit and the wired connector. The volume of the small-capacity battery does not exceed 7 cubic centimeters, and the weight of the small-capacity battery does not exceed 10 grams. The charging and discharging management unit is configured to control charging and discharging of the small-capacity battery.

Furthermore, the small-capacity battery is installed on a glasses leg of the AR glasses and forms counterweight balance with the optical machines installed on the front portion of the AR glasses.

Furthermore, the computing processing unit is a lightweight computing processing unit, selected from an SoC, an MCU, an FPGA and a CPLD.

Furthermore, the optical machines comprise a first optical machine and a second optical machine, wherein the first optical machine is used for left-eye imaging, and the second optical machine is used for right-eye imaging. The AR glasses further comprise a control unit. When the control unit recognizes that the wired connector is not connected to the host, the control unit controls the AR glasses to enter a monocular working mode, and when the control unit recognizes that the wired connector is connected with a host, the control unit controls the AR glasses to enter a binocular working mode, wherein the monocular working mode refers to that only one of the first optical machine and the second optical machine works, and the binocular working mode refers to that the first optical machine and the second optical machine work simultaneously.

Furthermore, the control unit is further configured to control the data processing unit to perform data processing in a preset low-power-consumption scene and not perform data processing in a preset high-power-consumption scene while recognizing that the wired connector is not connected to the host.

Furthermore, the preset low-power-consumption scene comprises motion prompt, information prompt, call, music playing, navigation prompt and voice recognition. The preset high-power-consumption scene comprises SLAM, infinite screen display, AR game, 2D/3D movie and image recognition processing.

Furthermore, the communication unit is in data communication with an external device through WIFI, BT, UWB, 4G or 5G, the external device comprising a mobile device and a base station.

The present invention further provides an AR glasses kit, comprising AR glasses and a host. The AR glasses comprise a power supply unit, a computing processing unit, a communication unit and a wired connector. The host comprises a processor and a host power supply, wherein the host is connected to the AR glasses through a wired connector, when the wired connector is not connected to the host, the power supply unit is configured to supply power to the AR glasses, the computing processing unit is configured to receive and process AR glasses data, and the communication unit is configured to perform data communication with an external device; and when the wired connector is connected to the host, a host power supply supplies power to the AR glasses and charges the power supply unit, and the computing processing unit is configured to receive AR glasses data, send the data to a processor of the host through the wired connector for processing, and receive the processed AR glasses data through the wired connector.

Compared with the prior art, the present invention has obvious advantages and beneficial effects. By means of the above technical solution, the AR glasses provided by the present invention can achieve considerable technical advancement and practicability, have wide industrial utilization value, and at least have the following advantages:

the AR glasses provided by the present invention can be used as both one-piece AR glasses and tethered AR glasses, and are portable, attractive and comfortable to wear. Under the scene that the AR glasses are connected to the host in a wired manner for use, the AR glasses can realize complete functions of the AR glasses. Under the scene without connection to the host, the AR glasses utilizes the mainstream interaction technology, such that the long duration can be guaranteed while realizing the functions of the AR glasses, and user's wearing experience is improved.

The above description is merely an overview of the technical solution of the present invention. In order to understand the technical means of the present invention more clearly, it can be implemented according to the content of the specification. And in order to make the above and other objects, features and advantages of the present invention more obvious and easy to understand, preferred embodiments are given below, and are described in detail as follows in conjunction with the accompanying drawings.

| [Callouts] | | | |
|---|---|---|---|
| 1: | power supply unit | 2: | computing processing unit |
| 3: | communication unit | 4: | wired connector |
| 5: | camera | 6: | inertial measurement unit |
| 7: | microphone | 8: | optical machine |
| 9: | loudspeaker | 11: | small-capacity battery |
| 12: | charging and discharging management unit | 81: | first optical machine |
| 82: | second optical machine | 10: | AR glasses |

| [Callouts] | | | |
|---|---|---|---|
| 20: | host | 201: | processor |
| 202: | host power supply | | |

DESCRIPTION OF EMBODIMENTS

In order to further illustrate the technical means and efficacy of the present invention to achieve the intended purpose, the following describes the specific implementation and efficacy of an AR glasses and an AR glasses kit according to the present invention in detail with reference to the accompanying drawings and preferred embodiments.

Figure 1:
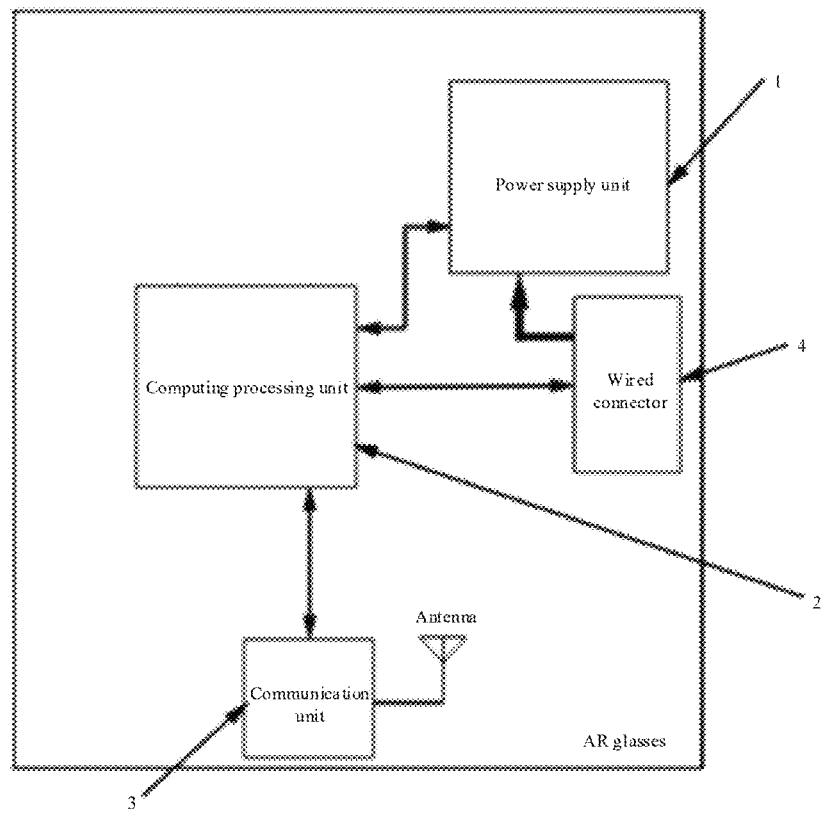
FIG. 1 is a schematic diagram of the composition of AR glasses according to an embodiment of the present invention.

The contradiction between battery capacity, device portability and device duration has always been a difficulty in the design of wearable products, especially AR glasses that are high in power consumption in main scenes and need high-capacity batteries to guarantee endurance. Therefore, existing products can only compromise the wearing comfort. Both one-piece AR glasses and tethered AR glasses cannot bring a real portable experience to users. On this basis, the embodiment of the present invention provides AR glasses, as shown in FIG. 1, including a power supply unit 1, a computing processing unit 2, a communication unit 3 and a wired connector 4, wherein the power supply unit 1 is respectively connected to the computing processing unit 2 and the wired connector 4, the computing processing unit 2 is respectively connected to the communication unit 3 and the wired connector 4, and the wired connector 4 is configured to be connected to a host.

When the wired connector 4 is not connected to the host, the AR glasses can be worn independently for use, and at the moment, the power supply unit 1 is configured to supply power to the AR glasses. The computing processing unit 2 is configured to receive and process AR glasses data, the AR glasses data referring to data acquired by a data acquisition unit in the AR glasses. The communication unit 3 is configured to perform data communication with an external device.

Figure 2:
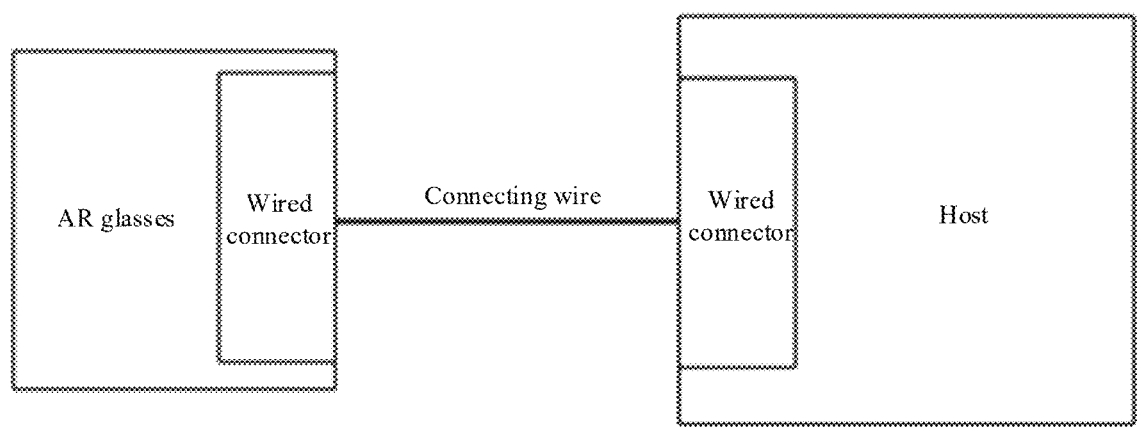
FIG. 2 is a schematic diagram of a connection between AR glasses and a host according to an embodiment of the present invention.

When the wired connector 4 is connected to the host, as shown in FIG. 2, a host power supply supplies power to the AR glasses and charges the power supply unit 1. The computing processing unit 2 is configured to receive the AR glasses data, send the data to a processor of the host through the wired connector 4 for processing, and receive the processed AR glasses data through the wired connector 4. The host may include a high-capacity lithium battery (such as more than 15 Wh), a high-performance processor (such as the main frequency more than 2 Ghz, the number of cores not less than 4), and a high-capacity memory (such as an 8 GB running memory and a 128 GB solid-state storage). Optionally, the host may exist in any style, or integrated in other existing products, such as smart phones, power banks, keyboards, mice, and the like.

The AR glasses provided by the embodiment of the present invention not only can be used as one-piece AR glasses, but also can be used as tethered AR glasses, such that user's wearing experience is improved while guaranteeing realization of the functions of the AR glasses.

Figure 3:
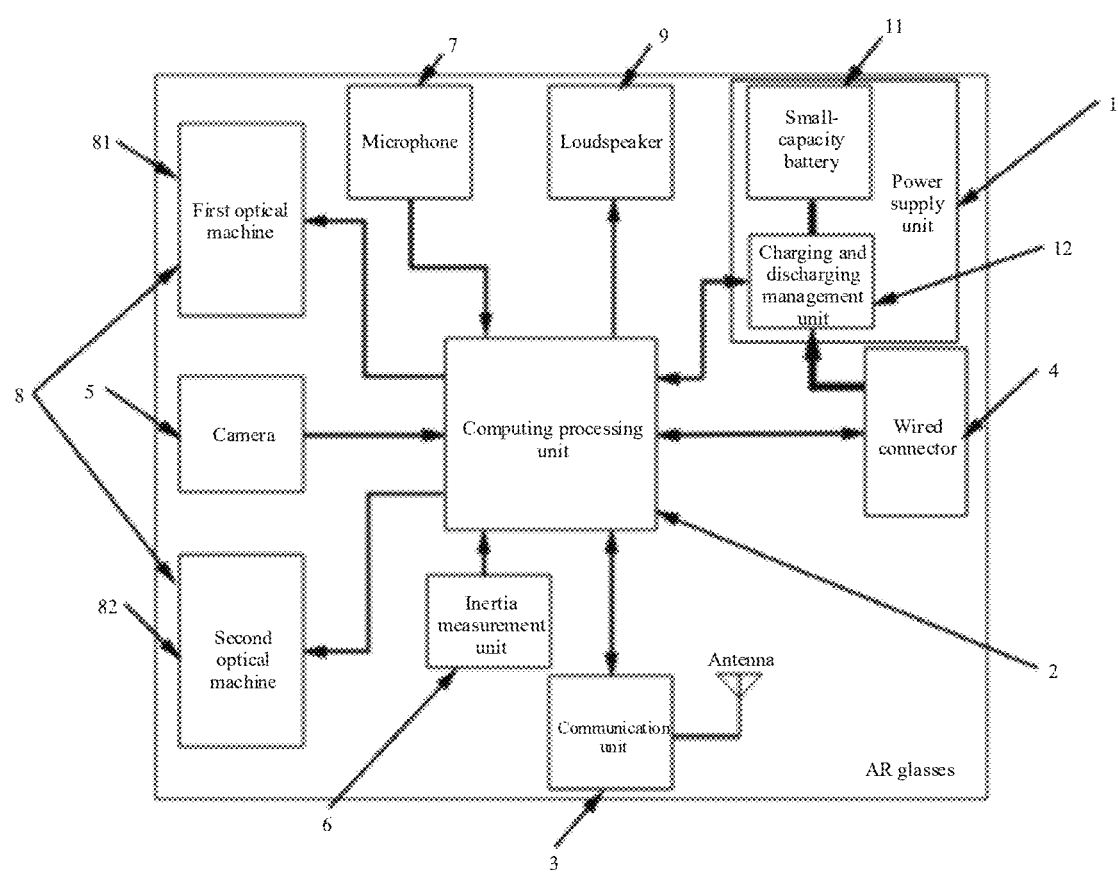
FIG. 3 is a schematic diagram of the composition of AR glasses according to another embodiment of the present invention.

As an example, as shown in FIG. 3, the AR glasses further include a camera 5, an inertial measurement unit 6, a microphone 7, optical machines 8 and a loudspeaker 9 which are connected to the computing processing unit 2. The AR glasses data includes data acquired by the camera 5, the inertial measurement unit 6, the microphone 7 and the communication unit 3. The computing processing unit 2 is configured to correspondingly output the processed AR glasses data to the optical machines 8, the loudspeaker 9 and the communication unit 3, so as to give visual feedback and auditory feedback to the user. The inertial measurement unit 6 includes an accelerometer, a gyroscope, a magnetometer and the like.

For example, as shown in FIG. 3, the power supply unit 1 comprises a small-capacity battery 11 and a charging and discharging management unit 12, wherein the small-capacity battery 11 is connected to the charging and discharging management unit 12, and the charging and discharging management unit 12 is respectively connected to the computing processing unit 2 and the wired connector 4. The volume of the small-capacity battery 11 does not exceed 7 cubic centimeters, and the weight of the small-capacity battery does not exceed 10 grams, which can effectively control the appearance and volume of the AR glasses, reduce the overall weight of the AR glasses, and meanwhile guarantee the duration of the AR glasses. The charging and discharging management unit 12 is configured to control charging and discharging of the small-capacity battery 11. When the AR glasses are connected to the host, the charging and discharging management unit 12 controls the small-capacity battery 11 to be in a charging state, and the small-capacity battery 11 is charged by the host power supply. When the AR glasses are not connected to the host, the charging and discharging management unit 12 controls the small-capacity battery 11 to be in a discharging state. At this time, the small-capacity battery 11 supplies power to each unit, needing power supply, of the AR glasses.

As an example, the small-capacity battery 11 can be installed on a glasses leg of the AR glasses and forms counterweight balance with the optical machines 8 installed on the front portion of the AR glasses, which is conductive to controlling the appearance and volume of the AR glasses but also improves user's wearing comfort.

As an example, the computing processing unit 2 is a lightweight computing processing unit 2, selected from a system on chip (SoC), a microcontroller unit (MCU), a field-programmable gate array (FPGA), a complex programmable logic device (CPLD), and the like.

Figure 4:
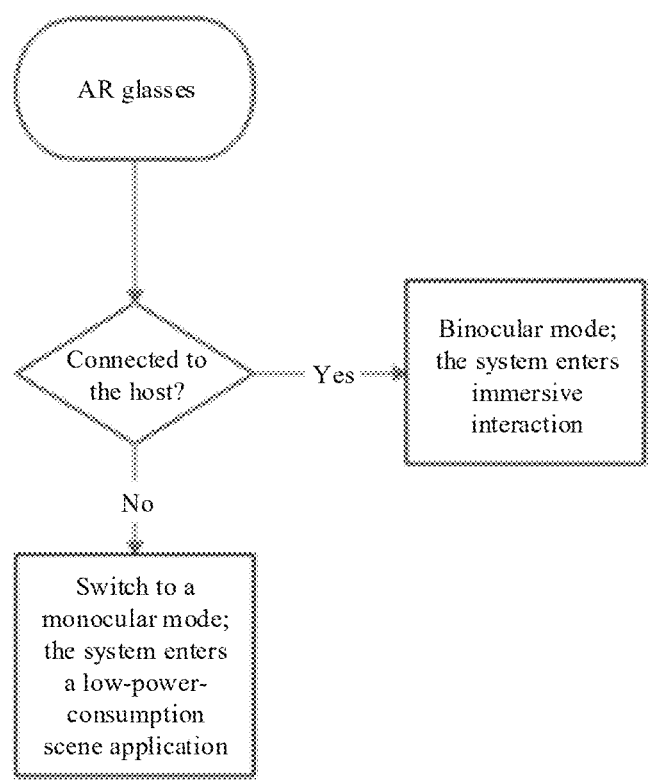
FIG. 4 is a schematic diagram of a workflow of AR glasses according to an embodiment of the present invention.

For example, as shown in FIG. 3, the optical machines 8 include a first optical machine 81 and a second optical machine 82, wherein the first optical machine 81 is used for left-eye imaging, and the second optical machine 82 is used for right-eye imaging. When the wired connector 4 is not connected to the host, the lightweight computing processing unit 2 serves as a core processor to receive data transmitted from the camera 5, the inertial measurement unit 6, the communication unit 3, the microphone 7 and the like. The data are output to the optical machines 8, the loudspeaker 9 and the communication unit 3 after computing processing. The built-in small-capacity battery 11 supplies power through the charging and discharging management unit 12. The communication unit 3 is responsible for carrying out data communication with the device such as a mobile phone and a tablet computer carried by a user or a base station. Since the optical machines 8 are components with high power consumption on the AR glasses, the AR glasses further include a control unit (not shown in the figure) to prolong the duration of the AR glasses when the AR glasses are worn independently without being connected to the host. The control unit can be independently arranged or directly arranged in the lightweight computing processing unit 2. As shown in FIG. 4, when the control unit recognizes that the wired connector 4 is not connected to the host, the control unit controls the AR glasses to enter a monocular working mode, and when the control unit recognizes that the wired connector 4 is connected to the host, the control unit controls the AR glasses to enter a binocular working mode, wherein the monocular working mode refers to that only one of the first optical machine 81 and the second optical machine 82 works, and the binocular working mode refers to that the first optical machine 81 and the second optical machine 82 work simultaneously.

The control unit is further configured to control the data processing unit to perform data processing in a preset low-power-consumption scene and not perform data processing in a preset high-power-consumption scene while recognizing that the wired connector 4 is not connected to the host. The preset low-power-consumption scene includes motion prompt, information prompt, call, music playing, navigation prompt and voice recognition, and the preset high-power-consumption scene includes simultaneous localization and mapping (SLAM), infinite screen display, AR game, 2D/3D movie and image recognition processing.

As an example, the communication unit 3 performs data communication with an external device through WIFI, Bluetooth (BT for short), Ultra Wideband (UWB for short), 4G or 5G. The external device includes a mobile device and a base station. The mobile device includes mobile phones, tablet computers and the like. The wired connector 4 may be a standard TYPE-C connector.

Figure 5:
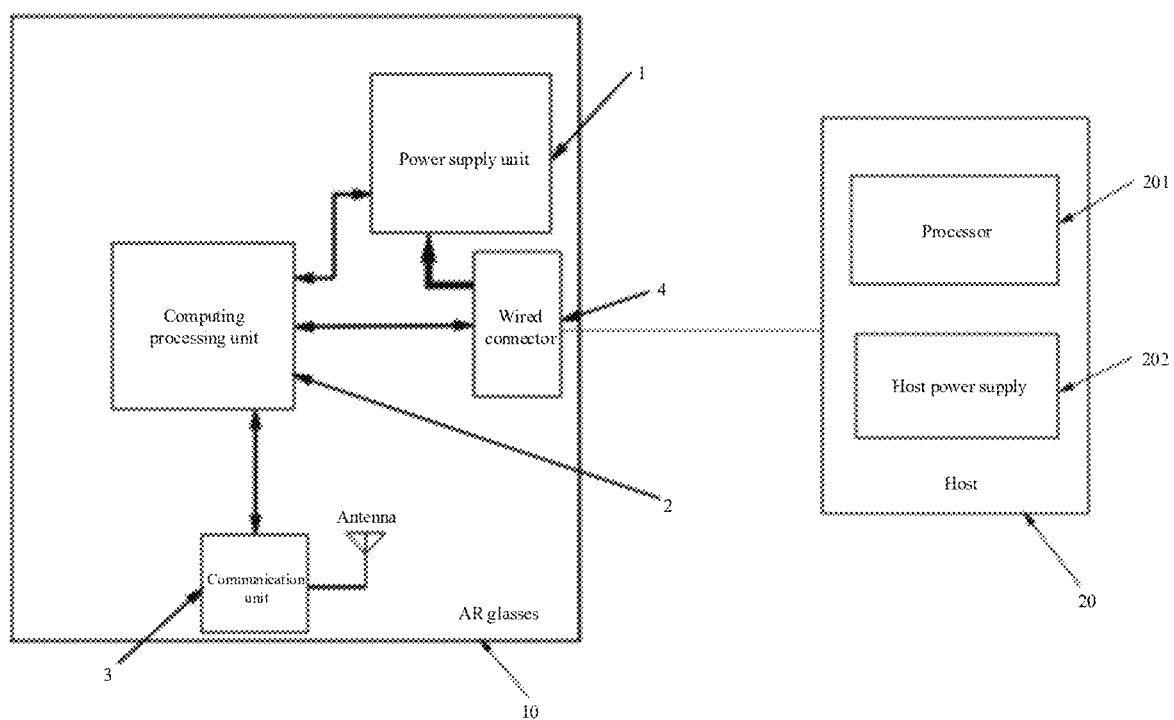
FIG. 5 is a schematic diagram of an AR glasses kit according to an embodiment of the present invention.

The embodiment of the present invention also provides an AR glasses kit, as shown in FIG. 5, including AR glasses 10 and a host 20. The AR glasses include a power supply unit 1, a computing processing unit 2, a communication unit 3 and a wired connector 4. The host 20 includes a processor 201 and a host power supply 202, wherein the host 20 and the AR glasses 10 are connected through the wired connector 4. When the wired connector 4 is not connected to the host 20, the power supply unit 1 is configured to supply power to the AR glasses 10. The computing processing unit 2 is configured to receive and process the AR glasses data. The communication unit 3 is configured to perform data communication with an external device. When the wired connector 4 is connected to the host 20, the host power supply 202 supplies power to the AR glasses 10 and charges the power supply unit 1. The computing processing unit 2 is configured to receive AR glasses data, send the data to the processor 201 of the host 20 through the wired connector 4 for processing, and receive the processed AR glasses data through the wired connector 4.

According to the embodiment of the invention, the existing battery technology and the performance of the computing processing unit 2 are fully utilized, and the advantages of the one-piece and tethered products of the AR glasses are combined. Under immersive experience scenes, such as SLAM, infinite screen display, AR games, 2D/3D movies and the like, the scenes are usually indoors, the human body is relatively fixed, the user can connect the AR glasses with the host in a wired mode for use, and the high-capacity battery of the host provides power to ensure long-term uninterrupted use of the AR glasses. The processor (including CPU and/or GPU, not shown) of the host provides powerful computing processing to guarantee excellent product performance experience. Under a single wearing scene, the AR glasses are powered by the built-in small-capacity battery 11, and through system optimization, the duration of more than 6 hours can be achieved, and thus the user experience is improved.

The above are only preferred embodiments of the present invention, and are not intended to limit the present invention in any form. Although the present invention has been disclosed above with preferred embodiments, it is not intended to limit the present invention. Any person skilled in the art, without departing from the scope of the present invention, can make some changes or modifications by utilizing the technical content disclosed above into equivalent embodiments of equivalent changes. However, any simple modifications, equivalent changes and modifications made to the above embodiments according to the technical essence of the present invention without departing from the content of the technical solutions of the present invention still fall within the scope of the technical solutions of the present invention.

What is claimed is:

1. AR glasses, comprising:
a power supply unit;
a computing processing unit;
a communication unit;
a control unit; and
a wired connector, wherein
the power supply unit is respectively connected to the computing processing unit and the wired connector, the computing processing unit is respectively connected to the communication unit and the wired connector, and the wired connector is configured to be connected to a host,
when the wired connector is not connected to the host, the power supply unit is configured to supply power to the AR glasses, the computing processing unit is configured to receive and process AR glasses data, and the communication unit is configured to perform data communication with an external device, and
when the wired connector is connected to the host, a host power supply supplies power to the AR glasses and charges the power supply unit, and the computing processing unit is further configured to:
receive the AR glasses data; and
send the data to a processor of the host through the wired connector for processing, and receive the processed AR glasses data through the wired connector,
wherein the control unit is further configured to control a data processing unit to perform data processing in a preset low-power-consumption scene and not perform data processing in a preset high-power-consumption scene while recognizing that the wired connector is not connected to the host,
wherein the preset low-power-consumption scene comprises at least one of motion prompt, information prompt, call, music playing, navigation prompt and voice recognition, and the preset high-power-consumption scene comprises at least one of a SLAM, an infinite screen display, an AR game, a 2D/3D movie and an image recognition processing,
wherein the AR glasses further comprise at least one of a camera, an inertial measurement unit, a microphone, optical machines and a loudspeaker which are connected to the computing processing unit, and
wherein the AR glasses data comprises data acquired by at least one of the camera, the inertial measurement unit, the microphone and the communication unit, and the computing processing unit is configured to correspondingly output the processed AR glasses data to the optical machines, the loudspeaker and the communication unit.

2. The AR glasses of claim 1, wherein,
the inertial measurement unit comprises at least one of an accelerometer, a gyroscope, and a magnetometer.

3. The AR glasses of claim 1, wherein
the power supply unit comprises a small-capacity battery and a charging and discharging management unit,
a volume of the small-capacity battery does not exceed 7 cubic centimeters,
a weight of the small-capacity battery does not exceed 10 grams, and
the charging and discharging management unit is configured to control charging and discharging of the small-capacity battery.

4. The AR glasses of claim 3, wherein,
the small-capacity battery forms counterweight balance with the optical machines installed on a front portion of the AR glasses.

5. The AR glasses of claim 1, wherein,
the computing processing unit is a lightweight computing processing unit, selected from an SoC, an MCU, an FPGA, and a CPLD.

6. The AR glasses of claim 1,
wherein, the optical machines comprise a first optical machine and a second optical machine,
wherein the first optical machine is configured for left-eye imaging, the second optical machine is configured for right-eye imaging,
wherein a monocular working mode refers to that only one of the first optical machine and the second optical machine works, and a binocular working mode refers to that the first optical machine and the second optical machine work simultaneously.

7. The AR glasses of claim 1, wherein,
the communication unit is in data communication with the external device through WIFI, BT, UWB, 4G or 5G, and
the external device comprising a mobile device and a base station.

8. An AR glasses kit, comprising:
AR glasses and a host, wherein the host comprises a processor and a host power supply;
the AR glasses comprise:
a power supply unit;
a computing processing unit;
a communication unit;
a control unit; and
a wired connector, wherein
the host is connected to the AR glasses through a wired connector,
when the wired connector is not connected to the host, the power supply unit is configured to supply power to the AR glasses, the computing processing unit is configured to receive and process AR glasses data, and the communication unit is configured to perform data communication with an external device,
when the wired connector is connected to the host, a host power supply supplies power to the AR glasses and charges the power supply unit, and the computing processing unit is further configured to:

receive the AR glasses data;
send the data to a processor of the host through the wired connector for processing, and receive the processed AR glasses data through the wired connector, wherein the control unit is further configured to control a data processing unit to perform data processing in a preset low-power-consumption scene and not perform data processing in a preset high-power-consumption scene while recognizing that the wired connector is not connected to the host, wherein the preset low-power-consumption scene comprises at least of motion prompt, information prompt, call, music playing, navigation prompt and voice recognition, and the preset high-power-consumption scene comprises at least one of SLAM, infinite screen display, AR game, 2D/3D movie and image recognition processing, wherein the AR glasses further comprise at least one of a camera, an inertial measurement unit, a microphone, optical machines and a loudspeaker which are connected to the computing processing unit, wherein the AR glasses data comprises data acquired by at least one of the camera, the inertial measurement unit, the microphone and the communication unit, and the computing processing unit is configured to correspondingly output the processed AR glasses data to the optical machines, the loudspeaker and the communication unit.

* * * * *